May 8, 1928.
G. E. STICKLER
1,668,700
GLASS MELTING AND REFINING TANK
Filed May 5, 1927   3 Sheets-Sheet 1
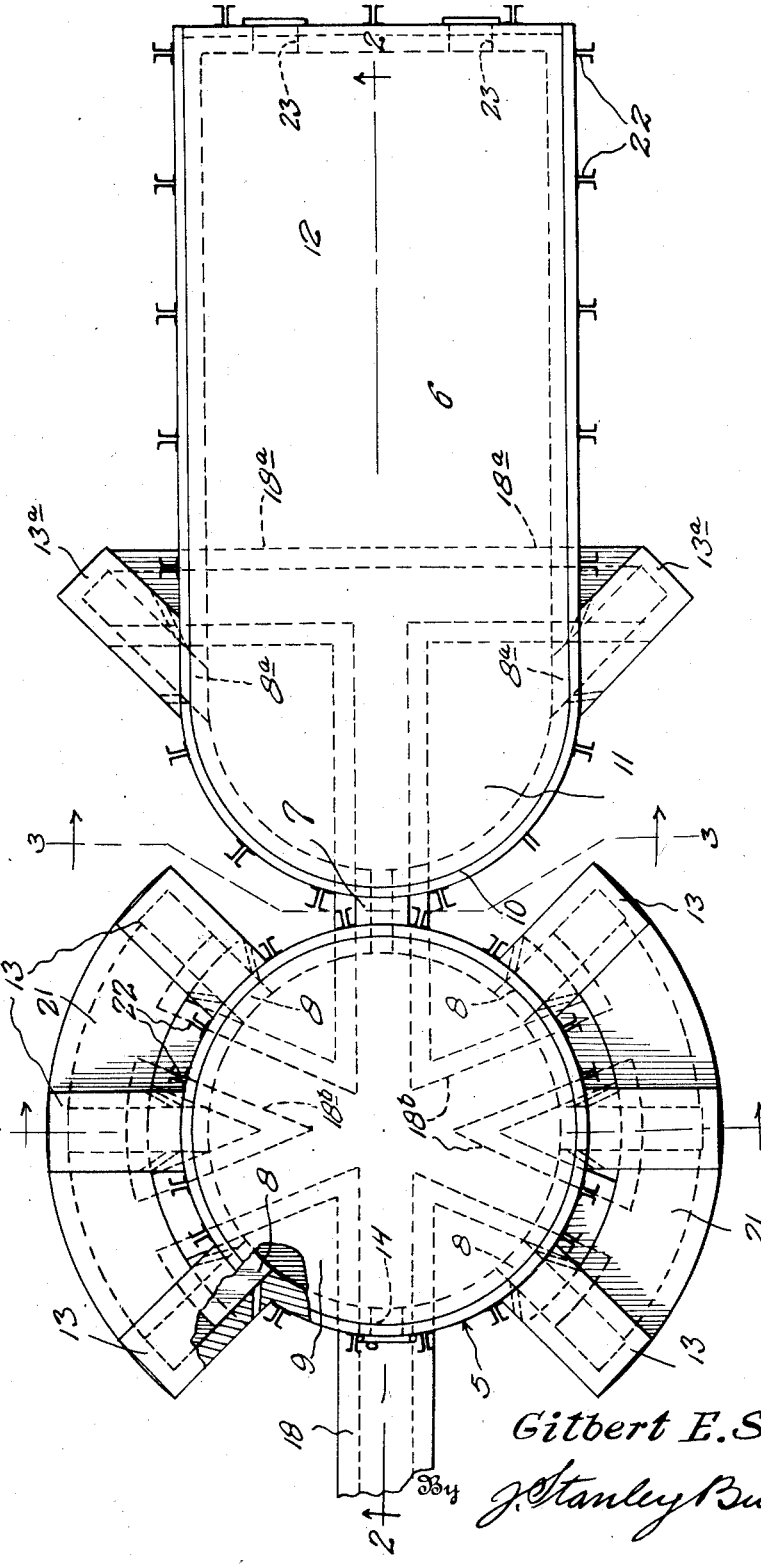
Inventor
Gilbert E. Stickler,
By J. Stanley Burch
Attorney

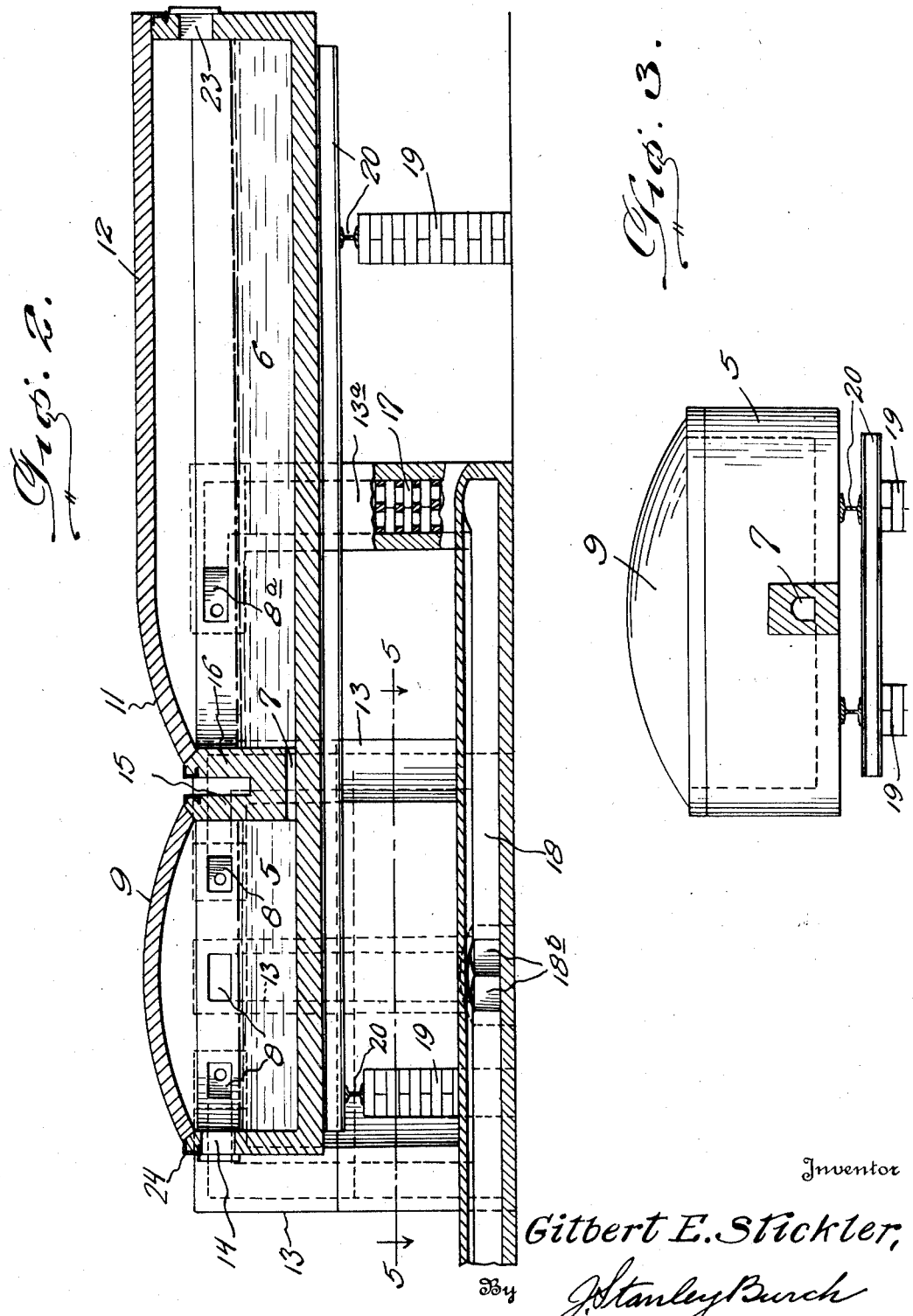

May 8, 1928.
G. E. STICKLER
1,668,700
GLASS MELTING AND REFINING TANK
Filed May 5, 1927
3 Sheets-Sheet 3
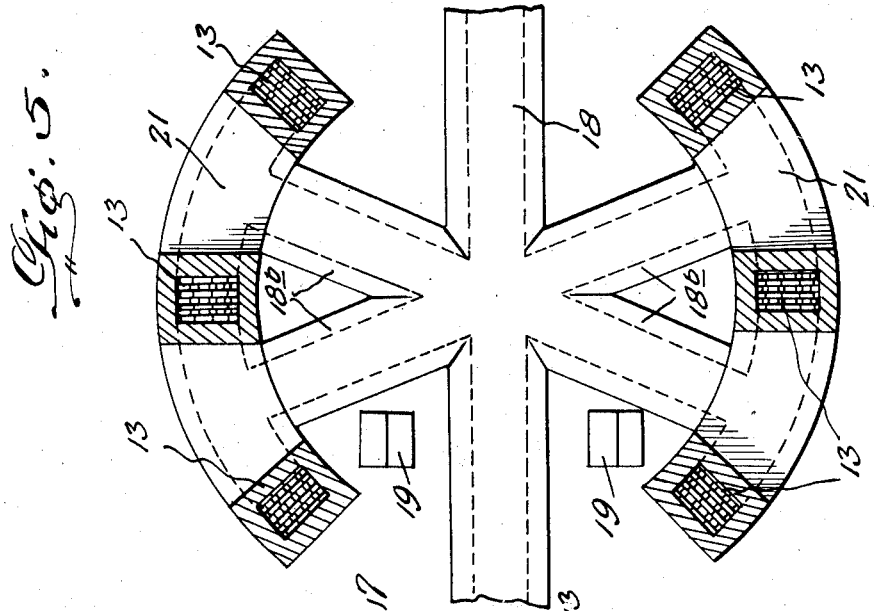
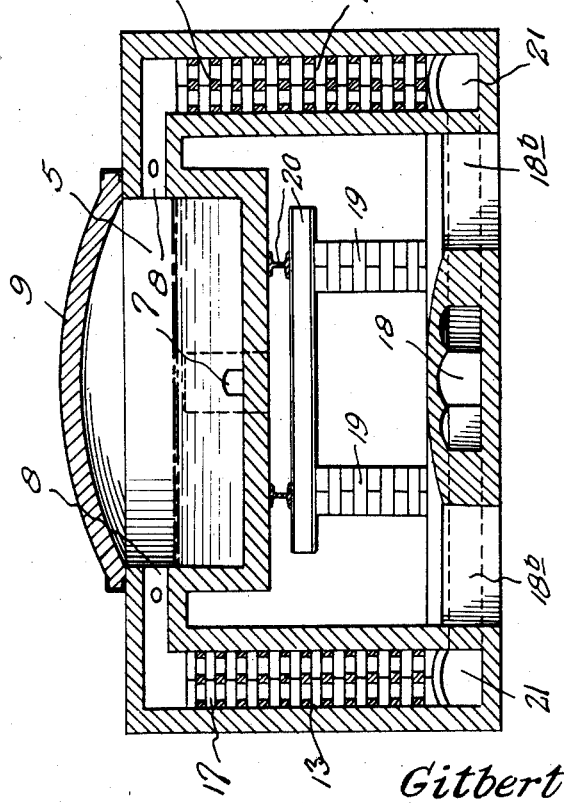
Inventor
Gilbert E. Stickler,
By J. Stanley Burch
Attorney Patented May 8, 1928.

1,668,700

UNITED STATES PATENT OFFICE.

GILBERT E. STICKLER, OF OKMULGEE, OKLAHOMA, ASSIGNOR OF ONE-THIRD TO JOHN F. LAWRENCE, OF OKMULGEE, OKLAHOMA.

GLASS MELTING AND REFINING TANK.

Application filed May 5, 1927. Serial No. 188,933.

This invention relates to regenerative glass melting and refining tanks, and has for its principal objects the provision of an improvement whereby increased capacity and lessened cost of operation is had over existing tanks without increase in size of the tanks or greater cost of construction of the same. Hitherto difficulty has been experienced in increasing the size and capacity of melting and refining tanks beyond certain limits, more or less recognized among manufacturers, due to the difficulty in properly melting and refining the larger quantity of glass required, corresponding to the increase in size.

My invention contemplates in its preferred practice, the maintenance of the dimensions of the melting and refining rooms or chambers at approximately the proportions corresponding to the accepted practice, but constructing the melting room or chamber and the rear receiving end of the elongated refining room or chamber of round or circular form in plan instead of square, constructing the top or roof of said melting room and of the receiving end of the refining chamber of convexo-spherical form or of arched form both transversely and longitudinally, and providing the sides of the melting section or room and of the receiving end of the refining section or room with radially arranged ports for regenerative heating means. In this manner the capacity of the tank is increased and the cost of operation is lowered, since the speed of reducing the batch or cullet from a solid to a liquid is largely increased with a corresponding reduction in gas consumption due to the peculiar reflection of heat and consequent maximum heating efficiency resulting from the round form of the melting room and of the heated receiving end of the refining room, the transversely and longitudinally arched roofs or arches of these elements, and the radial arrangement of the regenerator ports thereof. It can be readily seen that speed of reduction is the factor which largely governs the capacity of the tank, since the batch when reduced to molten form is readily refined in the refining chamber of the tank without any increase in the size of the latter chamber, the glass being properly refined even though the molten glass supplied at the heated receiving end of the refining chamber is very largely augmented.

As usual, the melting chamber is preferably placed in line with the heated end of the elongated refining chamber and is connected thereto by a suitable passage. Moreover, the invention is applicable to tanks for a number of different types of glass. In the manufacture of rolled glass, the delivery end of the apparatus would be adapted to form a continuous sheet or ribbon of glass which would be subsequently carried through a leer. A tank of this character must necessarily be of very large capacity since the operation is continuous and the amount of glass withdrawn per unit of time is large. However, the invention is not limited to any particular delivery end for the tank, since the purpose or form of the product as delivered from the tank is immaterial in so far as the present invention is concerned.

Other objects and advantages will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views:

Figure 1 is a top plan view, partly broken away and in section, of a glass melting tank constructed in accordance with my invention.

Figure 2 is a central vertical longitudinal section thereof.

Figure 3 is a fragmentary transverse section on line 3—3 of Figure 1.

Figure 4 is a transverse section through the melting chamber on line 4—4 of Figure 1, and Figure 5 is a fragmentary horizontal section on line 5—5 of Figure 2.

Referring more in detail to the drawings, 5 is the round or circular melting chamber or section of the regenerative glass tank and 6 is the elongated refining chamber or section thereof placed in line with the melting section 5 and connected to the latter by a suitable passage or throat 7.

The sets of ports 8 lead radially into the sides of the melting section beneath the convexo-spherical arch 9, and the rear or receiving end of the refining section is rounded, as at 10 (Fig. 1) and the opposed ports 8ª lead radially into this round end of the refining section beneath the segmental concavo-spherical rear arch portion 11 of said refining section, the remaining major portion 12 of the arch of the latter being convexed or arched only transversely. The mixture of gas and air from the regenerators 13 and 13$^a$ passes radially into the tank through the ports 8 and 8$^a$ and is burned intermediate the arch 9 and arch portion 11 and the surface of the bodies of glass in said sections. The direction of flow of air and gas is reversed at intervals, in a manner well known in connection with the use of regenerators with glass furnaces, there being nothing novel in the broad application of these regenerators to the tank.

The novel features in this construction are involved in the round form of the melting section 5 and of the receiving end 10 of the refining section 6, the consequent convexospherical form of the associated arch 9 and arch portion 11, and the radial relation of the regenerator ports 8 and 8$^a$ to the section 5 and the end 10, respectively, whereby special reflection and concentration of heat for its most intense and complete melting action on the glass is had, thus increasing the speed of reduction and secondary heating and economizing on the consumption of time and gas for a given output.

Batch is supplied to the melting section by shoveling through an opening 14 provided centrally in the rear side of said melting section.

The melting section 5 is shown as separated from the refining section 6 by means of walls 15 and 16 (Fig. 2) which extend up to a point above the level of the glass, communication between the two sections being afforded by means of the passageway or throat 7 which is located between the bottoms of the tank sections and the glass levels therein. However, it is to be understood that the provision of the throat 7 may be replaced by the provision of a floating bridge as is well known in the art. Checker work 17 is provided as usual in the regenerators.

A further novel feature of the invention resides in the manner of connecting the regenerators with the main flue that is adapted to lead to the usual stack or chimney, whereby the draft may be effectively controlled in a simple manner by the use of a damper in the main flue, the arrangement being efficient, simple, inexpensive and compact. It will be seen that the main flue 18 is horizontally and longitudinally arranged beneath the longitudinal center of the tank, the latter being suitably supported at the required elevation by pillars 19 and crossed longitudinal and transverse beams 20. The main flue 18 extends rearwardly from a point transversely alined with the regenerators 13$^a$, where it is connected with the lower ends of the latter by lateral branches 18$^a$, to a point rearwardly of the melting section 5 where it is adapted to connect with the usual stack or chimney, not shown. Connecting the lower ends of the regenerators 13, outwardly of and concentric with the sides of the tank section 5, are arcuate manifolds 21, and pairs of radial horizontal branches 18$^b$ connect the main flue 18 at a common point with the manifolds 21 at points between the regenerators 13 to avoid direct draft, three regenerators 13 being provided to each set.

The walls of the tanks are braced in the usual way by stays 22, and the delivery end of the refining section is illustrated with a pair of working ports 23 above the glass level.

To further strengthen the structure, each tank section has a tightly fitted channel ring 24 around the upper margin thereof with the upper inwardly projecting flange thereof overlying the upper edges of the associated tank section walls and the lower inwardly projecting flange thereof embedded in said walls.

The apparatus throughout is shown in simple form and it will be understood that it is capable of considerable modifications without departing from the spirit of the invention which is of wide scope and contemplates broadly, among other things, the provision of a circular melting section having side sets of opposed radial regenerator ports, the provision of an elongated refining section with a rounded receiving end having side opposed radial regenerator ports, or both.

Having described the invention, what I claim is:

1. In a regenerative glass melting and refining tank having batch supply and glass delivery ends, a melting section of circular form in plan provided with side sets of opposed radial regenerator ports.

2. In a regenerative glass melting and refining tank having batch supply and glass delivery ends, an elongated refining section having a rear receiving end portion of rounded form in plan provided with side opposed regenerator ports.

3. A regenerative glass melting and refining tank including a melting section of circular form in plan provided with side sets of opposed radial regenerator ports, and a refining section having a rear receiving end portion of rounded form in plan provided with side opposed regenerator ports, there being a passage connecting said sections, the melting section having a rear batch supply opening, and the refining section having a forward glass delivery end.

4. In a regenerative glass melting and refining tank having batch supply and glass delivery ends, a melting section of circular form in plan provided with side sets of opposed radial regenerator ports, regenerators connected to said melting section ports, arcuate horizontal manifolds connecting the lower ends of said regenerators, and a longitudinal main flue extending rearwardly beneath the tank and having radiating branches connecting to the manifolds.

5. In a regenerative glass melting and refining tank having batch supply and glass delivery ends, an elongated refining section having a rear receiving end portion of rounded form in plan provided with side opposed regenerator ports, regenerators connected to said refining section ports, and a longitudinal main flue extending rearwardly beneath the tank and having lateral branches connecting to the refining section regenerators.

6. A regenerative glass melting and refining tank including a melting section of circular form in plan provided with side sets of opposed radial regenerator ports, and a refining section having a rear receiving end portion of rounded form in plan provided with side opposed regenerator ports, there being a passage connecting said sections, the melting section having a rear batch supply opening, and the refining section having a forward glass delivery end, regenerators connected to said melting section ports, arcuate horizontal manifolds connecting the lower ends of said regenerators, and a longitudinal main flue extending rearwardly beneath the tank and having radiating branches connecting to the manifolds, and regenerators connected to said refining section ports, said longitudinal main flue extending rearwardly beneath the tank and having lateral branches connecting to the refining section regenerators.

7. In a regenerative glass melting and refining apparatus, a melting room of circular form in plan provided with a batch supply opening and a glass outlet and having side regenerator ports.

8. A regenerative glass melting and refining tank including a melting section of circular form in plan provided with side sets of opposed radial regenerator ports, and a refining section having a rear receiving end portion of rounded form in plan provided with side opposed regenerator ports, there being a passage connecting said sections, the melting section having a rear batch supply opening, and the refining section having a forward glass delivery end, said sections having arches, and bracing cap rings of channel form embracing the upper margins of the side walls of said sections and having flanges respectively engaging over the upper edges of and embedded in said walls.

9. In a regenerative glass melting and refining tank having batch supply and glass delivery ends, a melting section of circular form in plan provided with side sets of opposed radial regenerator ports, said melting section having a convexo-spherical arch.

10. In a regenerative glass melting and refining tank having batch supply and glass delivery ends, an elongated refining section having a rear receiving end portion of rounded form in plan provided with side opposed regenerator ports, said refining section being provided with an arch having a rear segmental convexo-spherical portion.

11. A regenerative glass melting and refining tank including a melting section of circular form in plan provided with side sets of opposed radial regenerator ports, and a refining section having a rear receiving end portion of rounded form in plan provided with side opposed regenerator ports, there being a passage connecting said sections, the melting section having a rear batch supply opening, and the refining section having a forward glass delivery end, said melting section having a convexo-spherical arch.

12. A regenerative glass melting and refining tank including a melting section of circular form in plan provided with side sets of opposed radial regenerator ports, and a refining section having a rear receiving end portion of rounded form in plan provided with side opposed generator ports, there being a passage connecting said sections, the melting section having a rear batch supply opening, the refining section having a forward glass delivery end, said melting section having a convexo-spherical arch, said refining section being provided with an arch having a rear segmental convexo-spherical portion.

In testimony whereof I affix my signature.

GILBERT E. STICKLER.